United States Patent
Hamzaoui et al.

(10) Patent No.: US 9,857,775 B2
(45) Date of Patent: Jan. 2, 2018

(54) METHOD, COMPUTER PROGRAM, AND COMPUTER FOR DETERMINING SYSTEM SITUATION

(75) Inventors: Karim Hamzaoui, Kanagawa (JP);
Shohei Hido, Kanagawa-ken (JP);
Shoko Suzuki, Kanagawa-ken (JP);
Rikiya Takahashi, Kanagawa-ken (JP);
Sachiko Yoshihama, Kanagawa-ken (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 534 days.

(21) Appl. No.: 13/976,491

(22) PCT Filed: Dec. 15, 2011

(86) PCT No.: PCT/JP2011/079069
§ 371 (c)(1),
(2), (4) Date: Jun. 27, 2013

(87) PCT Pub. No.: WO2012/090718
PCT Pub. Date: Jul. 5, 2012

(65) Prior Publication Data
US 2013/0274899 A1    Oct. 17, 2013

(30) Foreign Application Priority Data
Dec. 28, 2010 (JP) .................. 2010-293626

(51) Int. Cl.
*G05B 19/02*  (2006.01)
*G05B 9/02*   (2006.01)
(Continued)

(52) U.S. Cl.
CPC .......... *G05B 9/02* (2013.01); *G05B 23/0281* (2013.01); *G21D 3/001* (2013.01); *Y02E 30/40* (2013.01)

(58) Field of Classification Search
CPC ...... G05B 19/02; G05B 9/02; G05B 23/0281; G21D 3/001; Y02E 30/40
(Continued)

(56) References Cited

U.S. PATENT DOCUMENTS 6,507,933 B1 *  1/2003  Kirsch ............... H01L 22/20
                                                257/E21.525
6,870,374 B2 *  3/2005  Perkins ............. G01R 31/1263
                                                324/520
(Continued)

FOREIGN PATENT DOCUMENTS

CN  1160850 A  10/1997
CN  1489722 A   4/2004
(Continued)

*Primary Examiner* — Charles Kasenge
(74) *Attorney, Agent, or Firm* — Cantor Colburn LLP; David Quinn

(57) ABSTRACT

A method applied to a computer that determines a situation of a system includes the steps of: receiving measurement data from each of a plurality of measurement targets in the system; computing a plurality of sets of anomaly values based on the measurement data and a predetermined computation algorithm according to a plurality of classifications corresponding to a plurality of properties of each measurement target; and determining the situation of the system based on the sets of anomaly values and a predetermined determination algorithm.

23 Claims, 13 Drawing Sheets

(51) Int. Cl.
   *G05B 23/02*      (2006.01)
   *G21D 3/00*       (2006.01)
(58) Field of Classification Search
   USPC .......................................................... 700/81
   See application file for complete search history.

(56) References Cited

U.S. PATENT DOCUMENTS

| | | | | |
|---|---|---|---|---|
| 6,973,396 | B1* | 12/2005 | Shah | G05B 23/0229 |
| | | | | 702/179 |
| 7,729,789 | B2* | 6/2010 | Blevins | G05B 17/02 |
| | | | | 345/418 |
| 7,853,431 | B2* | 12/2010 | Samardzija | 702/179 |
| 8,032,341 | B2* | 10/2011 | Miller | C10G 11/187 |
| | | | | 703/2 |
| 8,055,479 | B2* | 11/2011 | Miller | G05B 23/024 |
| | | | | 702/189 |
| 8,135,481 | B2* | 3/2012 | Blevins | G05B 17/02 |
| | | | | 700/30 |
| 2005/0007249 | A1* | 1/2005 | Eryurek | G05B 23/027 |
| | | | | 340/511 |
| 2005/0267702 | A1* | 12/2005 | Shah | G05B 23/0229 |
| | | | | 702/81 |
| 2007/0005266 | A1* | 1/2007 | Blevins | G05B 17/02 |
| | | | | 702/22 |
| 2007/0067142 | A1* | 3/2007 | Kavaklioglu | G06F 11/008 |
| | | | | 702/182 |
| 2007/0150079 | A1* | 6/2007 | Blevins | G05B 23/0251 |
| | | | | 700/41 |
| 2007/0164853 | A1* | 7/2007 | Matsuda et al. | 340/438 |
| 2007/0198679 | A1* | 8/2007 | Duyanovich et al. | 709/223 |
| 2008/0082181 | A1* | 4/2008 | Miller et al. | 700/30 |
| 2008/0082302 | A1* | 4/2008 | Samardzija | G05B 23/021 |
| | | | | 703/2 |
| 2008/0082304 | A1* | 4/2008 | Miller | G05B 17/02 |
| | | | | 703/9 |
| 2010/0145542 | A1* | 6/2010 | Chapel | H02J 13/0082 |
| | | | | 700/295 |
| 2010/0222899 | A1* | 9/2010 | Blevins | G05B 17/02 |
| | | | | 700/80 |
| 2012/0136629 | A1* | 5/2012 | Tamaki et al. | 702/183 |

FOREIGN PATENT DOCUMENTS

| | | |
|---|---|---|
| CN | 1926488 A | 3/2007 |
| CN | 101339817 A | 1/2009 |
| JP | 06003637 B | 3/1989 |
| JP | 2236199 | 9/1990 |
| JP | H02236199 A | 9/1990 |
| JP | 030062101 A | 3/1991 |
| JP | H0362101 A | 3/1991 |
| JP | 08-220279 A | 8/1996 |
| JP | 08234832 A | 9/1996 |
| JP | 11344589 A | 12/1999 |
| JP | 2003195934 | 7/2003 |
| JP | 2004093256 A | 3/2004 |
| JP | 2004-206225 A | 7/2004 |
| JP | 2011-501851 A | 1/2011 |
| JP | 06331507 A | 12/2014 |
| TW | 201024945 A | 7/2007 |
| TW | 200928642 A | 7/2009 |
| TW | 200928643 A | 7/2009 |

* cited by examiner

METHOD, COMPUTER PROGRAM, AND COMPUTER FOR DETERMINING SYSTEM SITUATION

CROSS-REFERENCE TO RELATED APPLICATIONS

This application claims priority under 35 U.S.C. §371 to PCT Application PCT/JP2011/079069 filed on Dec. 15, 2011, which claims priority to Japanese Patent Application No. 2010-293626 filed Dec. 28, 2010, the entire contents of both applications are incorporated herein by reference.

DETAILED DESCRIPTION OF THE INVENTION

Technical Field

The present invention relates to a technique of determining the situation of a system or supporting the determination, and particularly to a technique suitable for determining the situation of an industrial control system.

Background Art

It has been increasingly difficult to address abnormal situations of complex systems, particularly in an environment that includes a mixture of a number of industrial control systems (ICSs). That is, since different types of abnormalities require different actions to be taken, it is important to not only detect an abnormality within the range of ICS maintenance but also quickly and accurately identify the type, location, and cause of the abnormality. For example, relationships between the type of an abnormality and actions to be taken for the abnormality may include the following: 1. for a software error in a terminal, restart and version-upgrade; 2. for a hardware failure in a terminal, repair and replacement; 3. for a network failure, identification of a failure point, repair and replacement of a network device, and reconnection; 4. for a network intrusion, shutout of an intruder, identification of where the intruder is from, and prevention of intrusion into other systems; 5. for a physical wrongdoing, identification of the location, capture of a wrongdoer, and prevention of secondary influences; and 6. for a trouble due to a natural disaster, identification of a disaster area and recognition of the range and degree of the trouble.

For the purpose of outlier detection etc. for complex systems such as plants, techniques including those described in the following patent literatures 1 to 3 have been proposed.
[Patent Literature 1] Japanese Patent Laid-Open No. 6-3637
[Patent Literature 2] Japanese Patent Laid-Open No. 11-344589
[Patent Literature 3] Japanese Patent Laid-Open No. 8-234832

DISCLOSURE OF THE INVENTION

Problems to be Solved by the Invention

Unfortunately, it is difficult to manually understand and represent data tendencies of all types of abnormalities, resulting in insufficient prerequisite knowledge for data obtained at the time of occurrence of an abnormality. Particularly, with the increase of mixed types of terminals and data, a versatile outlier detection technique capable of comprehensively dealing with all such terminals and data becomes unfeasible. On the other hand, severe requirements on the availability and the ability to take real-time countermeasure actions are imposed on ICSs. Therefore quick and accurate determination of the situation (efficient identification of the type, location, and cause of an abnormality) is quite important.

The present invention has been made in view of the above problems, and an object of the present invention is to provide a method, a computer program, and a computer for efficiently determining the type, location, and cause of an abnormality in a complex system or for supporting the determination.

SUMMARY OF THE INVENTION

When considered as a method, the present invention is a method applied to a computer that determines a situation of a system, including the steps of: receiving measurement data from each of a plurality of measurement targets in the system; computing a plurality of sets of anomaly values based on the measurement data and a predetermined computation algorithm according to a plurality of classifications corresponding to a plurality of properties of each measurement target; and determining the situation of the system based on the sets of anomaly values and a predetermined determination algorithm. The classifications may be hierarchical classifications or may be non-hierarchical classifications. Exemplary hierarchical classifications may include a hierarchical structure based on functions of the measurement targets, a hierarchical structure based on a network, a hierarchical structure based on physical areas, and a hierarchical structure based on the types of terminals. As the properties, independent properties different from each other may be employed.

It may be assumed that the system to be addressed includes a plurality of subsystems, each including various terminals (measurement targets). Specific examples of the terminals may include a sensor, an actuator, a control device, and a network device. As the measurement data, the state of each terminal may be chronologically measured. A specific example of the measurement data may be a physical measurement (the ICS operation state, or physical sensor information), and more specifically, temperature information or bulb opening/closing events inside a power plant. Another specific example of the measurement data may be a non-physical measurement (the state of an IT system), and more specifically, the network state (an access log, latency, or the packet loss rate), software information (version information, a job record, or a data exchange record), or hardware information (firmware information).

Approaches to detecting an abnormality from the measurement data may include 1. detecting an abnormality from a data set that is not known whether normal or abnormal, 2. detecting a known abnormality by using normal-time data and known abnormal-time data, and 3. detecting an unknown abnormality by using only normal-time data. In the approach 3, for example, chronological physical measurement/event data about a normally operating ICS is obtained as learning data, and latest chronological physical measurement/event data about the ICS is obtained as application data. Then, as an output, a normality/abnormality judgment or the degree of abnormality (a value representing the likeliness of abnormality) is output. Representative outlier detection techniques may include: Hotelling's $T^2$ test, One-class SVM, and Local Outlier Factor for numerical data; and infrequent pattern mining, Naive Bayes, and hidden Markov model for event data.

Specific examples of the properties may include functions, a network configuration, types, and installation locations of the measurement targets, organizations that manage the installation locations, and security levels of the installation locations. A hierarchical structure for function properties may include, for example, the entire nuclear power generation system→large functional elements (a steam generator, a turbine, and a power generator)→small functional elements (a feed-water unit, a sodium discharge unit, and a steam discharge unit)→terminals. A hierarchical structure for network properties may include the entire network→local areas→network terminals. A hierarchical structure for physical area properties may include the entire monitored (measured) facilities→facilities→floors→rooms. A hierarchical structure for terminal type properties may include all terminals→large classes (a sensor, an actuator, a control, and a network device)→small classes (a temperature sensor, a pressure sensor, and a sound sensor)→terminal types (a manufacturer, a manufacture number, and version). Any data format and any outlier detection algorithm may be used for each property and level. For example, Hotelling's $T^2$ test may be used for the chronological physical state of a plant, and Naive Bayes may be used for an access log of a network device.

The step of determining may include determining the situation of the system by comparing predetermined patterns of the sets of anomaly values corresponding to each situation of the system with the computed sets of anomaly values. Further, the step of determining may also include determining the situation of the system by comparing predetermined patterns of the sets of anomaly values corresponding to each situation of the system with simplified forms of the computed sets of anomaly values.

Further, the step of determining may include comparing predetermined patterns of the sets of anomaly values corresponding to each situation of the system with simplified forms of the computed sets of anomaly values and determining a situation corresponding to patterns with the highest degrees of similarity as the situation of the system. The step of determining may include determining the situation of the system with respect to changes over time in the sets of anomaly values, or irrespective of such changes over time.

The patterns of the sets of anomaly values are sets of anomaly scores computed for respective classifications and levels, and these patterns allow visualization of classifications/levels with high degrees of abnormality and other classifications/levels. For the patterns of the sets of anomaly values, chronological changes may also be taken into account as characteristics (with respect to the detection order and the detection frequency). When all values have low degrees of abnormality, those values are desirably not detected as a pattern. In the comparison of the patterns of the sets of anomaly values and the computed sets of anomaly values, perfect matching complicates calculation and has a low versatility. Particularly, the amount of computation explodes if the number of classes increases and the hierarchical structure grows. Therefore, loose matching based on the degree of similarity between patterns may be used to determine the patterns as the same anomaly pattern if the degree of similarity is high. For example, the degree of similarity may be determined according to the edit distance between pattern tree structures, or the commonality between partial structures of pattern tree structures. An abnormal pattern or an anomaly pattern may be defined as "a prepared set of anomaly values representing an abnormal characteristic (a matched set)" and "a current state=a computed set of anomaly values (a matching set)." That is, standard abnormal patterns (standard anomaly patterns) and a current abnormal pattern (a current anomaly pattern) may be compared.

Assuming two different properties, the step of computing may include the substeps of computing a first set of anomaly values based on the measurement data and a predetermined computation algorithm according to a first classification corresponding to a first property of each measurement target, and computing a second set of anomaly values based on the measurement data and a predetermined computation algorithm according to a second classification corresponding to a second property of each measurement target, and the step of determining may include determining the situation of the system based on the first set of anomaly values, the second set of anomaly values, and a predetermined determination algorithm. As a specific example, the step of computing may include the substeps of computing a set of network anomaly values based on the measurement data and a predetermined computation algorithm according to a network hierarchical structure corresponding to a network configuration of the measurement targets, and computing a set of location anomaly values based on the measurement data and a predetermined computation algorithm according to a location hierarchical structure corresponding to installation locations of the measurement targets, and the step of determining may include determining the situation of the system based on the set of network anomaly values, the set of location anomaly values, and a predetermined determination algorithm.

Further, assuming three different properties, the step of computing may further include the substep of computing a third set of anomaly values based on the measurement data and a predetermined computation algorithm according to a third classification corresponding to a third property of each measurement target, and the step of determining may include determining the situation of the system based on the first set of anomaly values, the second set of anomaly values, the third set of anomaly values, and a predetermined determination algorithm. As a specific example, the step of computing may include the substeps of computing a set of type anomaly values based on the measurement data and a predetermined computation algorithm according to a hierarchical structure corresponding to types of the measurement targets; computing a set of location anomaly values based on the measurement data and a predetermined computation algorithm according to a hierarchical structure corresponding to installation locations of the measurement targets; and computing a set of security anomaly values based on the measurement data and a predetermined computation algorithm according to a structure corresponding to security levels of the installation locations of the measurement targets, and the step of determining may include determining the situation of the system based on the set of type anomaly values, the set of location anomaly values, the set of security anomaly values, and a predetermined determination algorithm.

The method may further include the step of displaying a determination result of the situation of the system to a user, or may further include the step of displaying the sets of anomaly values and a determination result of the situation of the system to a user.

The system may be an industrial control system or may be an IT system.

It is to be understood that the present invention considered as a computer program or a computer system may include substantially the same technical features as the above-described present invention considered as a method.

ADVANTAGES OF THE INVENTION

According to the present invention, determination of the type, location, and cause of an abnormality in a complex system can efficiently be made or can be facilitated. That is, first, categorization can be simplified. The visualization of abnormal patterns in a plurality of classifications and hierarchical structures simplifies categorization of the type, location, and cause of an abnormality, so that the categorization is possible even with insufficient knowledge about data tendencies in various abnormal situations. The present invention can be used if there is preliminary knowledge about abnormal patterns. For example, determination can be made as follows: anomalous in a certain area and all ICSs→a trouble due to a natural disaster; anomalous in a certain area and a particular ICS→a physical wrongdoing; and anomalous in all areas and a particular ICS→a network intrusion. Second, the present invention can be applied in an environment that includes a mixture of different types of terminals and data, and algorithms suitable for measured terminals and data formats can be used. Third, the present invention has a highly real-time nature, so that a detected abnormality can be quickly categorized to take a quick countermeasure action for the detected abnormality. This can reduce the task of identifying the type, location, and cause of the abnormality after detecting the abnormality.

BEST MODE FOR CARRYING OUT THE INVENTION

Embodiments

Figure 1:
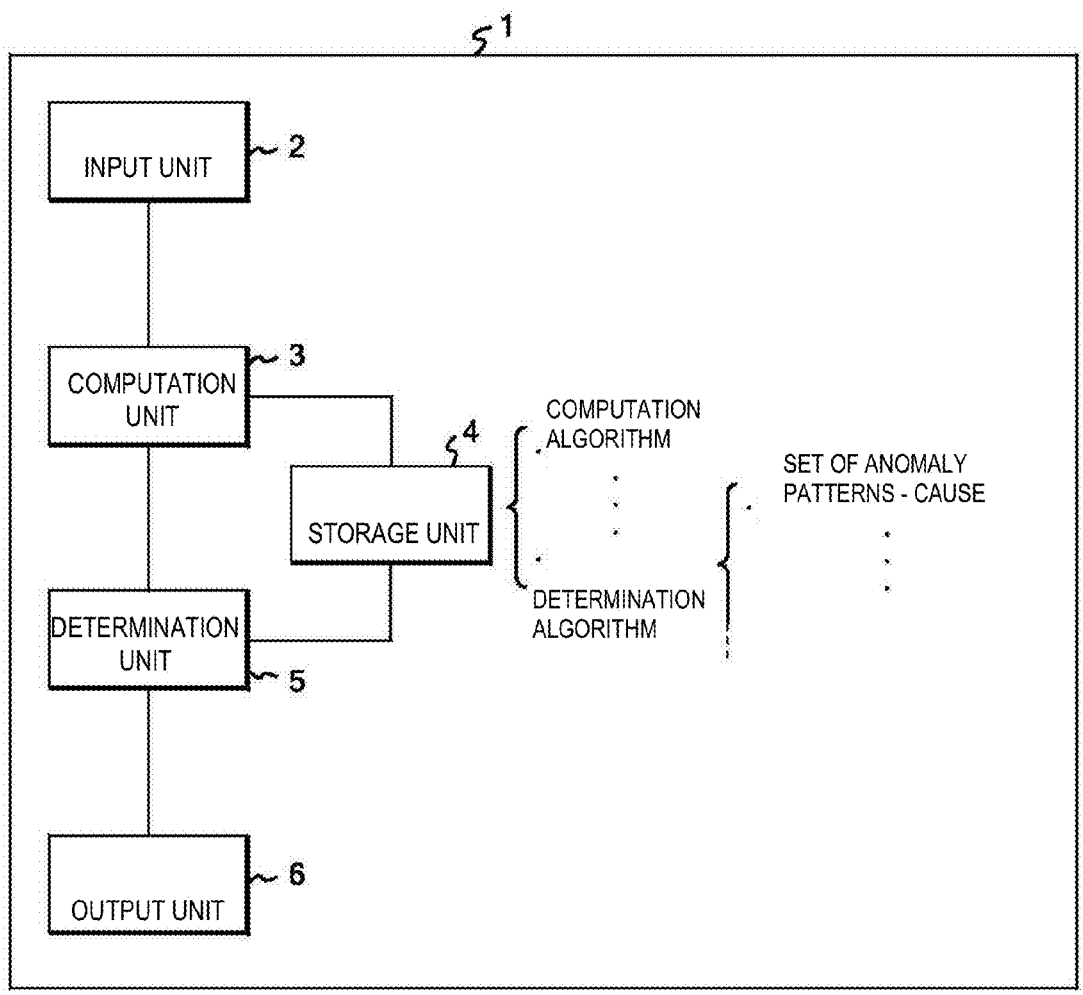
FIG. 1 is a block diagram showing functions of a determination apparatus 1.

FIG. 1 is a functional block diagram of a determination apparatus (a computer) according to embodiments. As shown, the determination apparatus 1 includes an input unit 2, a computation unit 3, a storage unit 4, a determination unit 5, and an output unit 6. A more detailed hardware architecture of the determination apparatus 1 will be described below with reference to FIG. 14.

Figure 2:
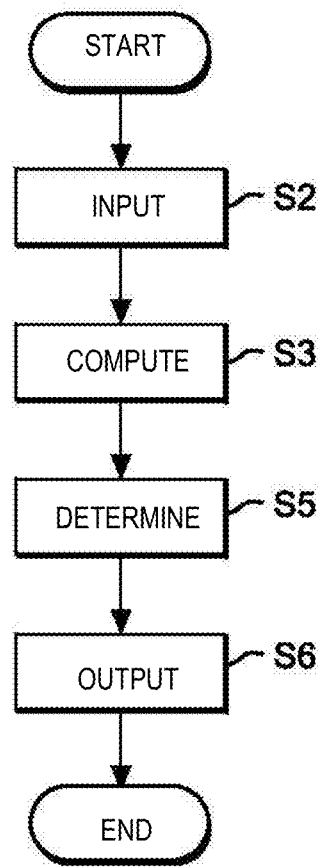
FIG. 2 is a flowchart showing operations of the determination apparatus 1.

FIG. 2 is a flowchart describing basic operations of the determination apparatus 1. As shown, the determination apparatus 1 receives measurement data from each of a plurality of measurement targets in the system (S2), computes a plurality of sets of anomaly values based on the measurement data and a predetermined computation algorithm according to a plurality of classifications corresponding to a plurality of properties of each measurement target (S3), determines the situation of the system based on the sets of anomaly values and a predetermined determination algorithm (S5), and outputs the determination result to a user (S6).

Figure 3:
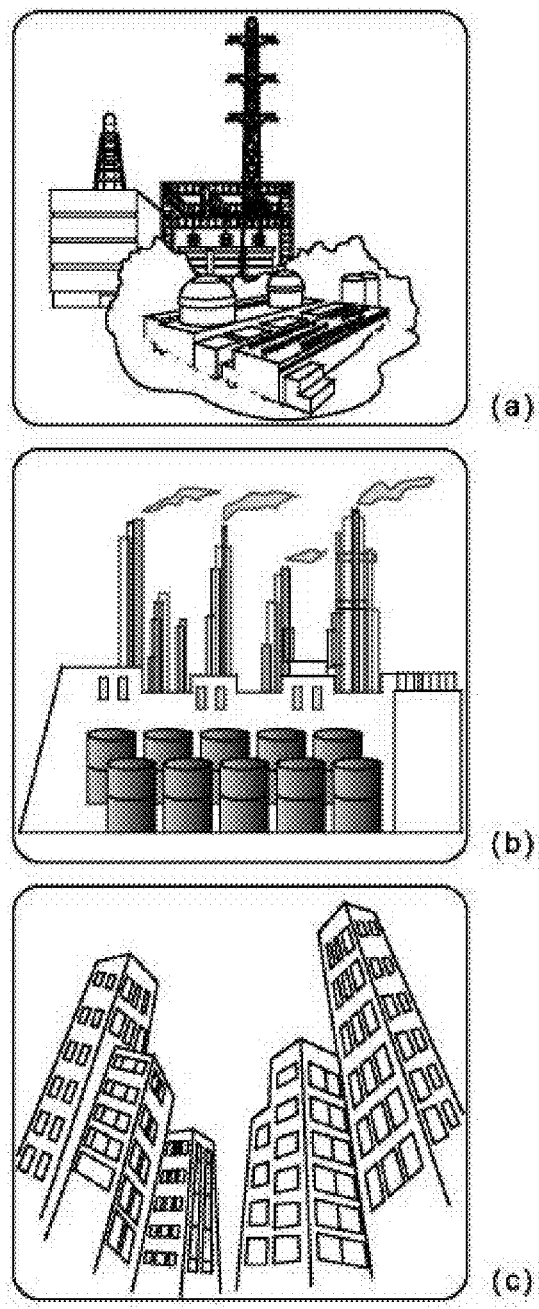
FIG. 3 is an illustration of systems to which the present invention is applicable.

FIG. 3 illustrates systems to which the determination apparatus 1 is applicable. The determination apparatus 1 is applied to industrial control systems. Specific examples thereof may include a group of power generation facilities (FIG. 3 (a)), a group of factory facilities (FIG. 3 (b)), and a group of building facilities (FIG. 3 (c)), and further, although not shown, a group of power supply facilities, a group of water supply facilities, and a group of transportation network facilities.

First Embodiment

A first embodiment will be described below by taking an exemplary case in which the above determination apparatus 1 is applied to a group of power generation facilities (FIG. 3 (a)), particularly a group of nuclear power generation facilities. This description serves to further clarify the meaning of the function of each functional block of the determination apparatus 1 shown in FIG. 1 and the operation in each step of the determination apparatus 1 shown in FIG. 2.

Figure 4:
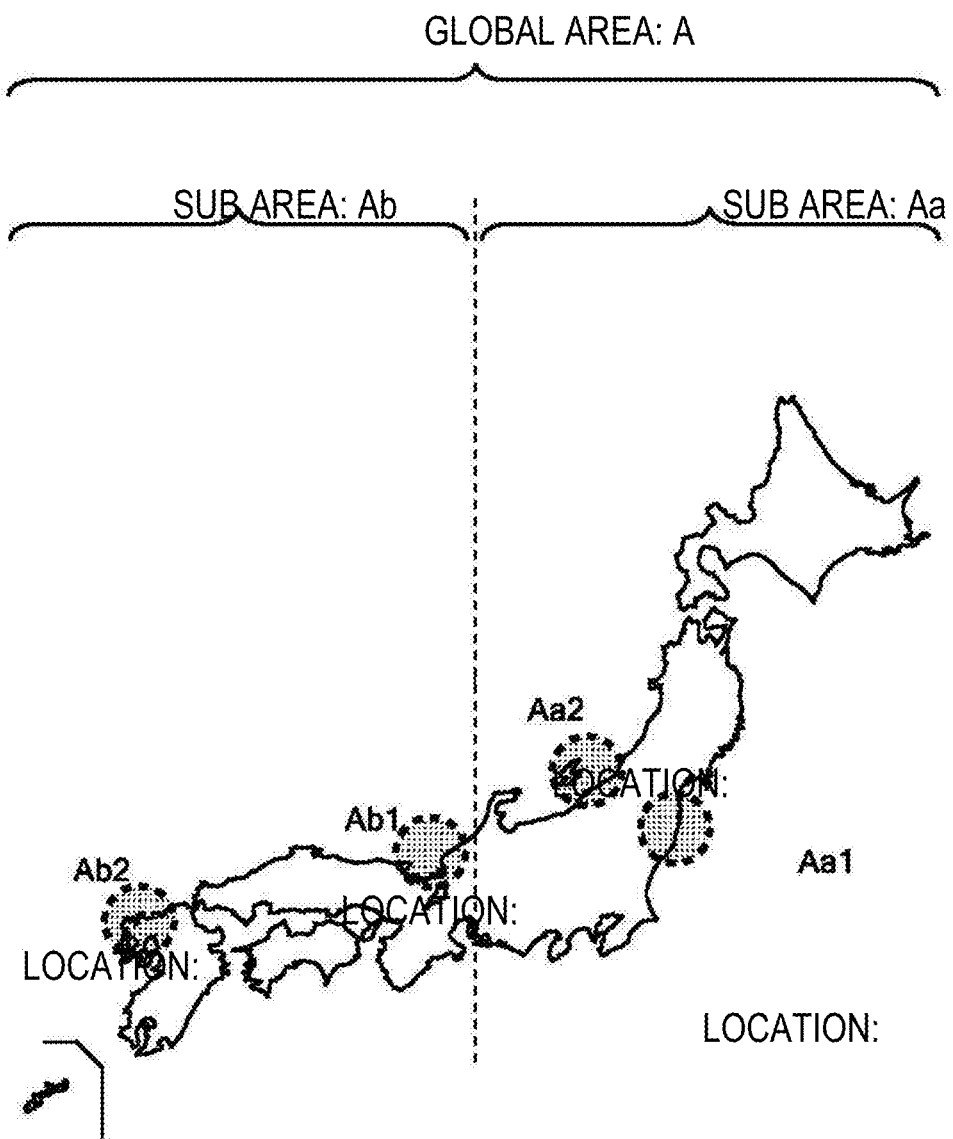
FIG. 4 is a diagram describing installation locations.

FIG. 4 describes installation locations of a group of nuclear power generation facilities addressed by the determination apparatus 1 in a hierarchical classification structure. The installation locations of the group of nuclear power generation facilities addressed by the determination apparatus 1 include a global area A (Japan) at the top level, and a sub area Aa (eastern Japan) and a sub area Ab (western Japan) exist at the middle level below the global area A. Further, a location Aa1 (Fukushima) and a location Aa2 (Niigata) exist at the bottom level below the sub area Aa, and a location Ab1 (Fukui) and a location Ab2 (Saga) exist at the bottom level below the sub area Ab.

Figure 5:
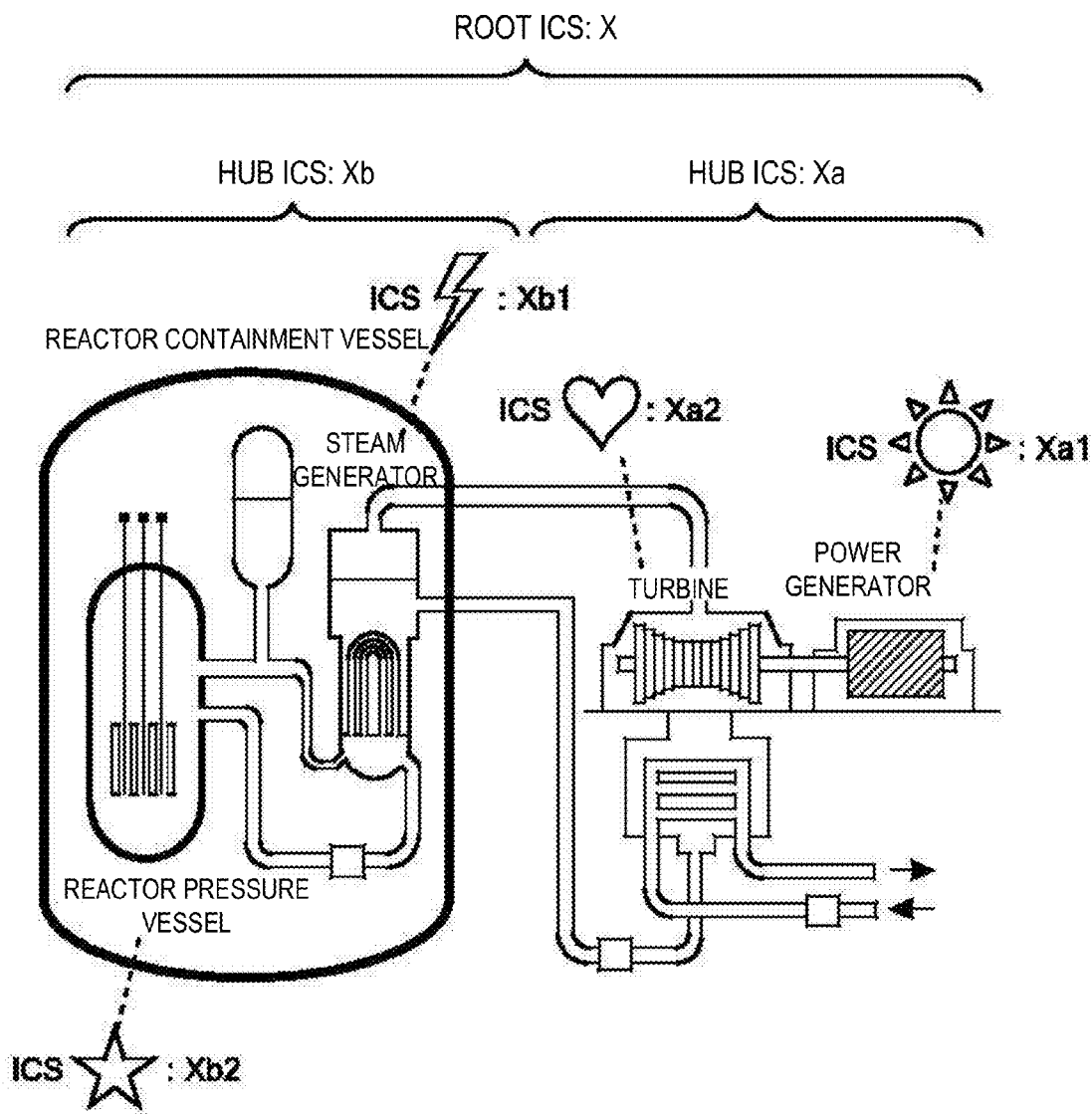
FIG. 5 is a diagram describing a network configuration.

FIG. 5 describes a network configuration of the group of nuclear power generation facilities addressed by the determination apparatus 1 in a hierarchical classification structure. The network configuration of the group of nuclear power generation facilities addressed by the determination apparatus 1 includes a root ICS X (a nuclear power generation facility) at the top level, and a hub ICS Xa (a turbine system) and a hub ICS Xb (a nuclear reactor system) exist at the middle level below the root ICS X. Further, an ICS Xa1 (a power generator: a sun mark) and an ICS Xa2 (a turbine: a heart mark) exist at the bottom level below the hub ICS Xa, and an ICS Xb1 (a steam generator: a lightning mark) and an ICS Xb2 (a nuclear reactor: a star mark) exist at the bottom level below the hub ICS Xb.

Figure 6:
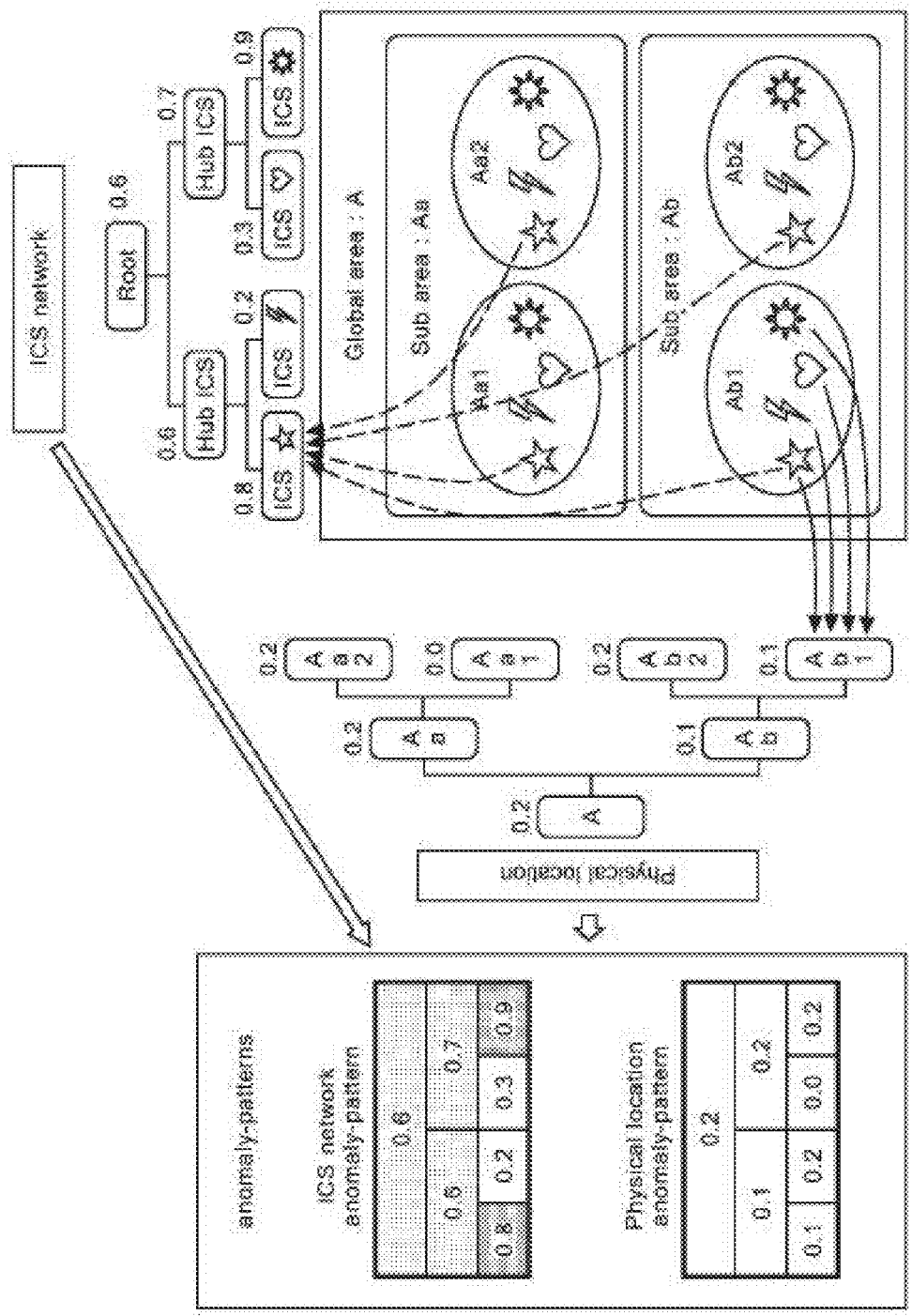
FIG. 6 is a diagram describing a first embodiment.

FIG. 6 represents the installation locations and the network configuration shown in FIGS. 4 and 5 as hierarchical tree structures, respectively, to describe an anomaly score of each element and an anomaly pattern of each of the installation locations and the network configuration.

The input unit 2 of the determination apparatus 1 directly or indirectly receives measurement data from each of many measurement targets in the group of nuclear power generation facilities (step S2 in FIG. 2). The computation unit 3 of the determination apparatus 1 computes two anomaly patterns, each consisting of anomaly scores, based on the measurement data and a computation algorithm stored in advance in the storage unit 4 according to two classifications corresponding to two properties (here, the installation locations and the network configuration of the group of nuclear power generation facilities) of the measurement targets (step S3 in FIG. 2). An anomaly score is represented here as a gradual value between 0 denoting a normal state and 1 denoting an abnormal state. An anomaly pattern is represented here as a pattern in which each anomaly score is evaluated (simplified) on a scale of three grades (normal—unshaded, rather abnormal—light-shaded, and highly abnormal—dark-shaded).

For example, measurement data from a nuclear power generation facility located at the location Ab1 (Fukui) is used to compute the anomaly score of the location Ab1 (Fukui), the value of which is 0.1 here. Similarly, the values of the anomaly scores of the locations Aa2 (Niigata), Aa1 (Fukushima), and Ab2 (Saga) are 0.2, 0.0, and 0.2, respectively. The values of the anomaly scores of the sub area Aa (eastern Japan) and the sub area Ab (western Japan) are computed as 0.2 and 0.1, respectively, by using the values of the anomaly scores of their respective bottom-level location groups and a computation algorithm stored in advance in the storage unit 4. Similarly, the value of the anomaly score of the global area A (Japan) is computed as 0.2 by using the values of the anomaly scores of the sub area Aa (eastern Japan) and the sub area Ab (western Japan) and a computation algorithm stored in advance in the storage unit 4.

From these anomaly scores, an anomaly pattern shown in the left part of FIG. 6 is computed. Specifically, the value of each anomaly score is evaluated as normal (smaller than 0.5) with no shade, rather abnormal (not smaller than 0.5 and smaller than 0.8) with light shade, or highly abnormal (0.8 or greater) with dark shade. In the illustrated case, the value of any anomaly score is smaller than 0.5. Therefore the anomaly pattern corresponding to the installation locations of the group of nuclear power generation facilities has no shaded portions, as shown.

Further, measurement data from the nuclear power generation facility corresponding to the ICS Xb2 (the nuclear reactor) in the network configuration is used to compute the anomaly score of the ICS Xb2 (the nuclear reactor: the star mark), the value of which is 0.8 here. Similarly, the values of the anomaly scores of Xb1 (the steam generator: the lightning mark), the ICS Xa2 (the turbine: the heart mark), and Xa1 (the power generator: the sun mark) are 0.2, 0.3, and 0.9, respectively. The values of the anomaly scores of the hub ICS Xa (the turbine system) and the hub ICS Xb (the nuclear reactor system) are computed as 0.7 and 0.6, respectively, by using the values of the anomaly scores of their respective bottom-level ICS groups and a computation algorithm stored in advance in the storage unit 4. Similarly, the value of the anomaly score of the root ICS X (the nuclear power generation facility) is computed as 0.6 by using the values of the anomaly scores of the hub ICS Xa (the turbine system) and the hub ICS Xb (the nuclear reactor system) and a computation algorithm stored in advance in the storage unit 4.

From these anomaly scores, an anomaly pattern shown in the left part of FIG. 6 is computed. Specifically, the value of each anomaly score is evaluated as normal (smaller than 0.5) with no shade, rather abnormal (not smaller than 0.5 and smaller than 0.8) with light shade, or highly abnormal (0.8 or greater) with dark shade. In the illustrated case, the values of the anomaly scores vary widely. Therefore the anomaly pattern corresponding to the network configuration of the group of nuclear power generation facilities has dark-shaded portions, light-shaded portions, and unshaded portions, as shown.

As the computation algorithms for computing the values of the anomaly scores, the following algorithms may be employed: Hotelling's $T^2$ test, One-class SVM, and Local Outlier Factor for numerical data; and infrequent pattern mining, Naive Bayes, and hidden Markov model for event data.

Although the example described here uses only the values of lower-level anomaly scores for computing the value of a higher-level anomaly score, the anomaly score may be computed in other manners, for example by using measurement data from other measurement targets.

The storage unit 4 of the determination apparatus 1 stores known situations of the group of nuclear power generation facilities (specifically, (1) the type of an abnormality that has occurred, (2) the location where the abnormality has occurred, and (3) the cause of the abnormality), and anomaly patterns corresponding to the installation locations and the network configuration of the group of nuclear power generation facilities under each situation, where each situation and the anomaly patterns are stored as associated with each other.

The determination unit 5 of the determination apparatus 1 compares changes over time in each of the anomaly patterns corresponding to the installation locations and the network configuration of the group of nuclear power generation facilities with the both types of anomaly patterns stored in advance in the storage unit 4. The determination unit 5 then determines, as the situation of the group of nuclear power generation facilities, a situation corresponding to patterns with the highest degrees of similarity (step S5 in FIG. 2). Specific examples of this will be described below as (case 1-1) to (case 1-3).

Figure 7:
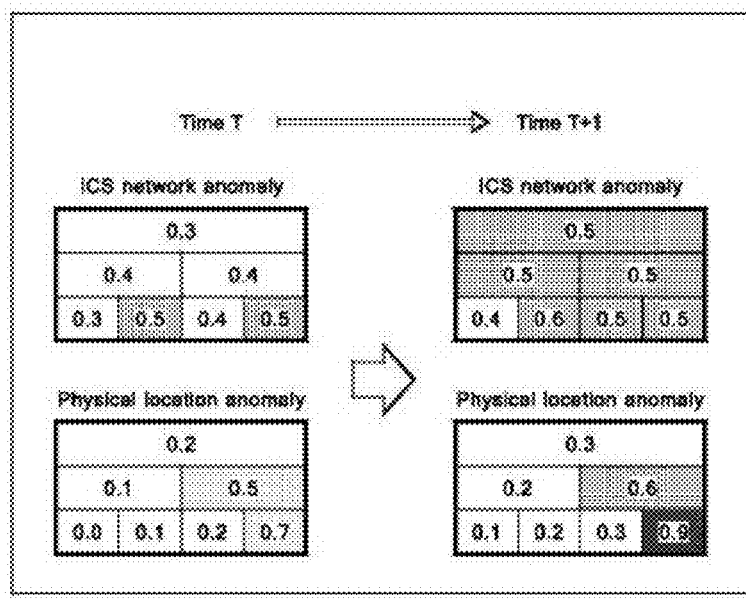
FIG. 7 is a diagram describing a case 1-1.

(Case 1-1) FIG. 7 shows changes over time in each of the anomaly patterns corresponding to the installation locations and the network configuration of the group of nuclear power generation facilities in a case 1-1. As shown, after a lapse of time from a time T to a time T+1, in the anomaly pattern corresponding to the installation locations of the group of nuclear power generation facilities, the value of the anomaly score of only a particular location, i.e., the location Aa2 (Niigata) is high (0.9). In the anomaly pattern corresponding to the network configuration of the group of nuclear power generation facilities, the values of the anomaly scores are generally rather high (0.5 or 0.6). The determination unit 5 searches the storage unit 4 for similar anomaly patterns of the both types. As a situation of the group of nuclear power generation facilities corresponding to the both types of anomaly patterns with the highest degrees of similarity, the determination unit 5 determines, for example, (1) the type of an abnormality that has occurred: a natural disaster, (2) the location where the abnormality has occurred: mainly the location Aa2 (Niigata), and (3) the cause of the abnormality: an influence of an earthquake on the ICS.

Figure 8:
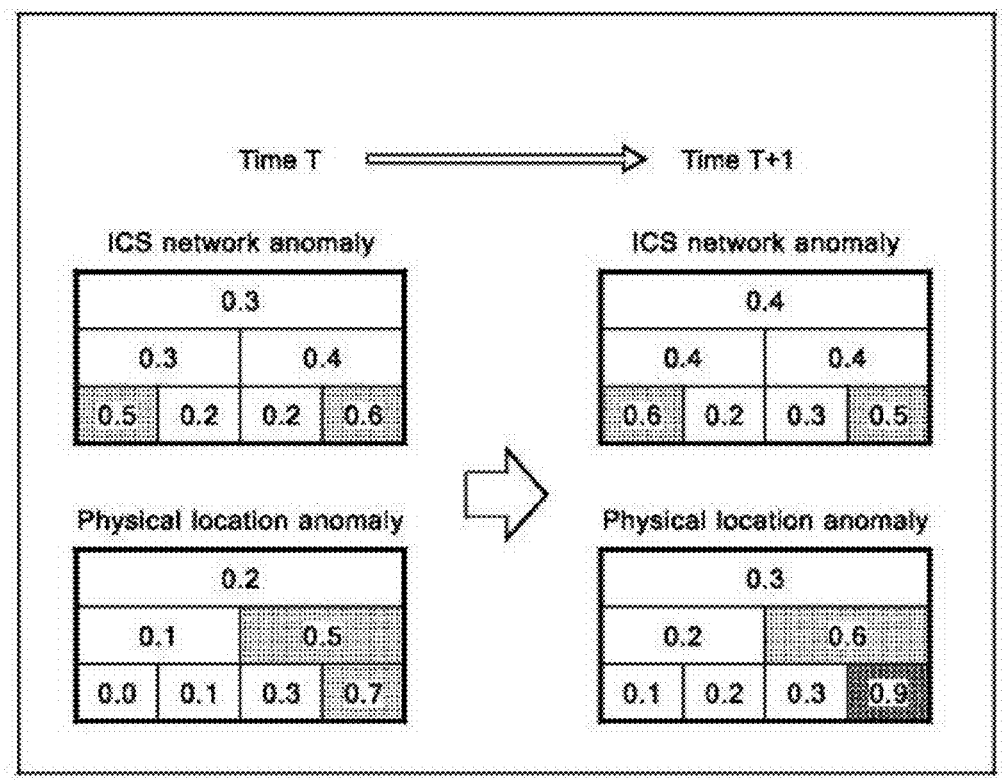
FIG. 8 is a diagram describing a case 1-2.

(Case 1-2) FIG. 8 shows changes over time in each of the anomaly patterns corresponding to the installation locations and the network configuration of the group of nuclear power generation facilities in a case 1-2. As shown, after the lapse of time from a time T to a time T+1, in the anomaly pattern corresponding to the installation locations of the group of nuclear power generation facilities, the value of the anomaly score of only a particular location, i.e., the location Aa2 (Niigata) is high (0.9). In the anomaly pattern corresponding to the network configuration of the group of nuclear power generation facilities, the values of the anomaly scores of only particular ICSs (Xb2 (the nuclear reactor) and Xa1 (the power generator)) are rather high (0.5 or 0.6). The determination unit 5 searches the storage unit 4 for similar anomaly patterns of the both types. As a situation of the group of nuclear power generation facilities corresponding to the both types of anomaly patterns with the highest degrees of similarity, the determination unit 5 determines, for example, (1) the type of an abnormality that has occurred: a wrongdoing, (2) the location where the abnormality has occurred: the location Aa2 (Niigata), and (3) the cause of the abnormality: a physical attack on Xb2 (the nuclear reactor) and Xa1 (the power generator).

Figure 9:
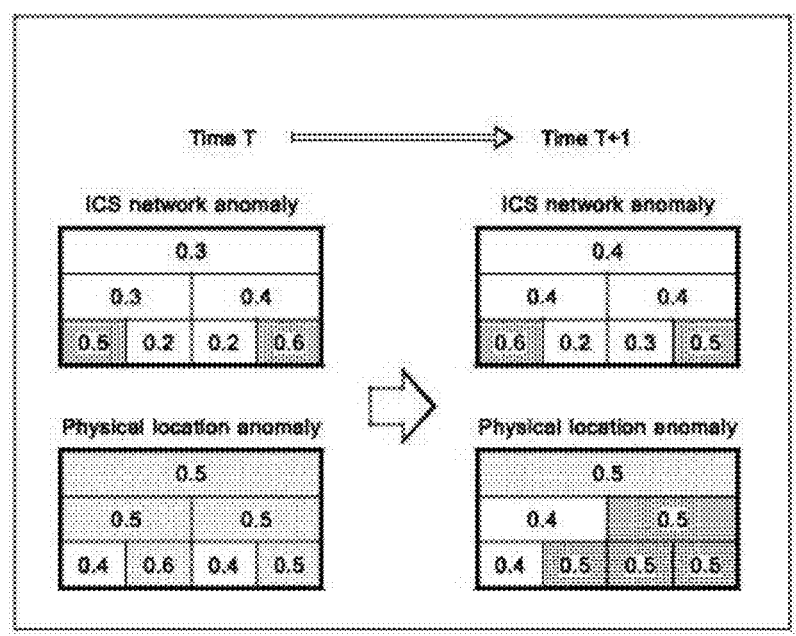
FIG. 9 is a diagram describing a case 1-3.

(Case 1-3) FIG. 9 shows changes over time in each of the anomaly patterns corresponding to the installation locations and the network configuration of the group of nuclear power generation facilities in a case 1-3. As shown, after the lapse of time from a time T to a time T+1, in the anomaly pattern corresponding to the installation locations of the group of nuclear power generation facilities, the values of the anomaly scores are generally rather high (0.4 or 0.5). In the anomaly pattern corresponding to the network configuration of the group of nuclear power generation facilities, the value of the anomaly score of only particular ICSs (Xb2 (the nuclear reactor) and Xa1 (the power generator)) are rather high (0.5 or 0.6). The determination unit 5 searches the storage unit 4 for similar anomaly patterns of the both types. As a situation of the group of nuclear power generation facilities corresponding to the both types of anomaly patterns with the highest degrees of similarity, the determination unit 5 determines, for example, (1) the type of an abnormality that has occurred: an intrusion, (2) the location where the abnormality has occurred: Xb2 (the nuclear reactor) and Xa1 (the power generator), and (3) the cause of the abnormality: vulnerability of the Xb2 (the nuclear reactor) and Xa1 (the power generator).

The output unit 6 of the determination apparatus 1 displays to a user the anomaly patterns corresponding to the installation locations and the network configuration of the group of nuclear power generation facilities computed by the computation unit 3, and the situation of the group of nuclear power generation facilities determined by the determination unit 5 (step S6 in FIG. 2).

Second Embodiment

A second embodiment will be described below by taking an exemplary case in which the determination apparatus 1 is applied to a group of building facilities (FIG. 3 (c)). This description, as with the above-described first embodiment, serves to further clarify the meaning of the function of each functional block of the determination apparatus 1 shown in FIG. 1 and the operation in each step of the determination apparatus 1 shown in FIG. 2.

Locations of the group of building facilities addressed by the determination apparatus 1 include a global area A (a maritime city) at the top level, and a sub area Aa (a business tower) and a sub area Ab (a residence tower) exist at the middle level below the global area A. Further, a location Aa1 (a lower area of the business tower) and a location Aa2 (an upper area of the business tower) exist at the bottom level below the sub area Aa, and a location Ab1 (a lower area of the residence tower) and a location Ab2 (an upper area of the residence tower) exist at the bottom level below the sub area Ab. The business tower and the residence tower may be managed by the same entity (organization) or different entities (organizations). Also, the lower area and the upper area of each tower may be managed by the same entity (organization) or different entities (organizations).

Device types of the group of office building facilities addressed by the determination apparatus 1 include a device type Y (temperature sensor) at the top level, and a device type Ya (manufactured by Y company) and a device type Yb (manufactured by X company) exist at the middle level below the device type Y. Further, a device type Ya2 (version 5.0) and Ya1 (version 3.0) exist at the bottom level below the device type Ya, and a temperature sensor Yb2 (version 2.0) and a temperature sensor Yb1 (version 1.3) exist at the bottom level below the device type Yb.

Further, security levels of the group of office building facilities addressed by the determination apparatus 1 include three levels: a security level Za (a public area) that permits anyone's entry, a security level Zb (authorized personnel only) that permits entry of limited people (e.g., workers of a particular company), and a security level Zc (a forbidden area) that permits no entry as a rule.

Figure 10:
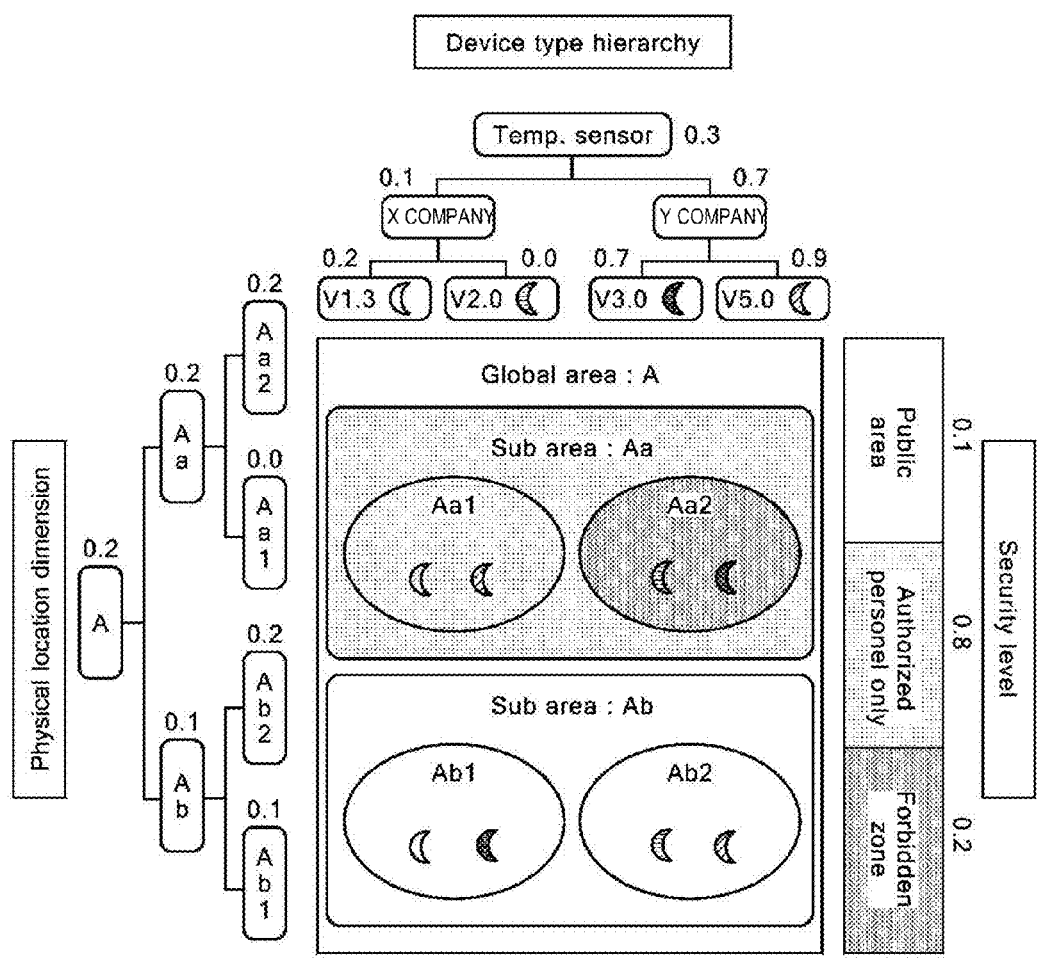
FIG. 10 is a diagram describing a second embodiment.

FIG. 10 represents the locations, device types, and security levels of the group of office building facilities as hierarchical tree structures or classifications, respectively, to describe an anomaly score of each element and an anomaly pattern of each of the locations, device types, and security levels of the group of office building facilities.

The input unit 2 of the determination apparatus 1 directly or indirectly receives measurement data from each of many measurement targets (devices) in the group of office building facilities (step S2 in FIG. 2). The computation unit 3 of the determination apparatus 1 computes three anomaly patterns, each consisting of anomaly scores, based on the measurement data and a computation algorithm stored in advance in the storage unit 4 according to three classifications corresponding to three properties (here, the locations, device types, and security levels of the group of office building facilities) of the measurement targets (step S3 in FIG. 2). An anomaly score is represented here as a gradual value between 0 denoting a normal state and 1 denoting an abnormal state, as in the first embodiment. An anomaly pattern is represented here as a pattern in which each anomaly score is evaluated (simplified) on a scale of three grades (normal—unshaded, rather abnormal—light-shaded, and highly abnormal—dark-shaded), as in the first embodiment.

For example, measurement data from devices in the group of office building facilities located at the installation location Ab1 (the lower area of the residence tower) is used to compute the anomaly score of the installation location Ab1 (the lower area of the residence tower), the value of which is 0.1 here. Similarly, the values of the anomaly scores of the installation locations Aa2 (the upper area of the business tower), Aa1 (the lower area of the business tower), and Ab2 (the upper area of the residence tower) are 0.2, 0.0, and 0.2, respectively. The values of the anomaly scores of the sub area Aa (the office tower) and the sub area Ab (the residence tower) are computed as 0.2 and 0.1, respectively, by using the values of the anomaly scores of their respective bottom-level installation location groups and a computation algorithm stored in advance in the storage unit 4. Similarly, the value of the anomaly score of the global area A (the maritime city) is computed as 0.2 by using the values of the anomaly scores of the sub area Aa (the office tower) and the sub area Ab (the residence tower) and a computation algorithm stored in advance in the storage unit 4.

From these anomaly scores, an anomaly pattern is computed as in the first embodiment. Specifically, the value of each anomaly score is evaluated as normal (smaller than 0.5) with no shade, rather abnormal (not smaller than 0.5 and smaller than 0.8) with light shade, or highly abnormal (0.8 or greater) with dark shade. In the illustrated case, the value of any anomaly score is smaller than 0.5. Therefore the anomaly pattern corresponding to the installation locations of the devices in the group of office building facilities has no shaded portions.

Further, measurement data from a device corresponding to the device type Yb1 (version 1.3) for the group of office building facilities addressed by the determination apparatus 1 is used to compute the anomaly score of the device type Yb1 (version 1.3), the value of which is 0.2 here. Similarly, the values of the anomaly scores of Yb2 (version 2.0), Ya1 (version 3.0), and Ya2 (version 5.0) are 0.0, 0.7, and 0.9, respectively. The values of the anomaly scores of the device type Ya (manufactured by Y company) and the device type Yb (manufactured by X company) are computed as 0.7 and 0.1, respectively, by using the values of the anomaly scores of their respective bottom-level device types and a computation algorithm stored in advance in the storage unit 4. Similarly, the value of the anomaly score of the device type Y (the temperature sensor) is computed as 0.3 by using the values of the anomaly scores of the device type Ya (manufactured by Y company) and the device type Yb (manufactured by X company) and a computation algorithm stored in advance in the storage unit 4.

From these anomaly scores, an anomaly pattern is computed as in the first embodiment. Specifically, the value of each anomaly score is evaluated as normal (smaller than 0.5) with no shade, rather abnormal (not smaller than 0.5 and smaller than 0.8) with light shade, or highly abnormal (0.8 or greater) with dark shade. In the illustrated case, the values of the anomaly scores vary widely. Therefore the anomaly pattern corresponding to the types of the devices in the group of office building facilities has dark-shaded portions and unshaded portions.

Further, measurement data from the devices corresponding to the security level Za (the public area) of the group of office building facilities addressed by the determination apparatus 1 is used to compute the anomaly score of the security level Za (the public area), the value of which is 0.1 here. Similarly, the values of the anomaly scores of the security levels Zb (authorized personnel only) and Zc (the forbidden area) are 0.8 and 0.2, respectively. From these anomaly scores, an anomaly pattern is similarly computed. Specifically, the value of each anomaly score is evaluated as normal (smaller than 0.5) with no shade, rather abnormal (not smaller than 0.5 and smaller than 0.8) with light shade, or highly abnormal (0.8 or greater) with dark shade. In the illustrated case, the values of the anomaly scores vary widely. Therefore the anomaly pattern corresponding to the security levels of the devices in the group of office building facilities has dark-shaded portions and unshaded portions.

In this embodiment, the installation location Aa1 (the lower area of the business tower) corresponds to the security level Zb (authorized personnel only), the installation location Aa2 (the upper area in the business tower) corresponds to the security level Zc (the forbidden area), and the installation locations Ab1 (the lower area of the residence tower) and Ab2 (the upper area in the residence tower) correspond to the security level Za (the public area). Each installation location has two devices installed therein. The device types Yb1 (version 1.3) and Ya2 (version 5.0) are installed in the installation location Aa1 (the lower area of the business tower). The device types Yb2 (version 2.0) and Ya1 (version 3.0) are installed in the installation location Aa2 (the upper area in the business tower). The device types Yb1 (version 1.3) and Ya1 (version 3.0) are installed in the installation location Ab1 (the lower area of the residence tower). The device types Yb2 (version 2.0) and Ya2 (version 5.0) are installed in the installation location Ab2 (the upper area in the residence tower).

The storage unit 4 of the determination apparatus 1 stores known situations of the group of office building facilities (specifically, (1) the type of an abnormality that has occurred, (2) the location where the abnormality has occurred, and (3) the cause of the abnormality), and three anomaly patterns (three anomaly patterns corresponding to the device installation locations, device types, and device security levels) under each situation, where each situation and the three anomaly patterns are stored as associated with each other.

The determination unit 5 of the determination apparatus 1 compares changes over time in each of the three anomaly patterns with the three types of anomaly patterns stored in advance in the storage unit 4. The determination unit 5 then determines, as the situation of the group of office building facilities, a situation corresponding to patterns with the highest degrees of similarity (step S5 in FIG. 2). Specific examples of this will be described below as (case 2-1) to (case 2-3).

Figure 11:
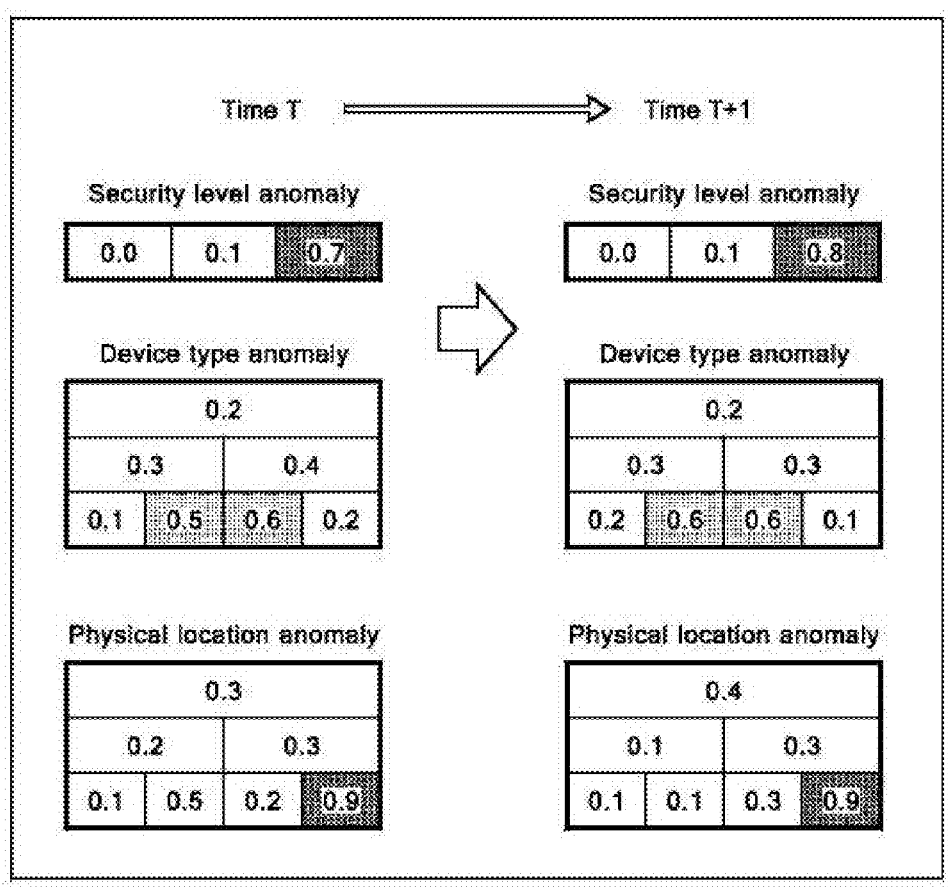
FIG. 11 is a diagram describing a case 2-1.

(Case 2-1) FIG. 11 shows changes over time in each of the three anomaly patterns corresponding to the device installation locations, device types, and device security levels of the group of office building facilities in a case 2-1. As shown, after the lapse of time from a time T to a time T+1, in the anomaly pattern corresponding to the device installation locations, the value of the anomaly score of only a particular installation location, i.e., Aa2 (the upper area in the business tower) is high (0.9). The values of the anomaly scores of the other installation locations, including the adjacent installation location Aa1 (the lower area of the business tower), are not so high. In the anomaly pattern corresponding to the device types, the values of the anomaly scores of the temperature sensor Yb2 (version 2.0) and the temperature sensor Ya1 (version 3.0) (both installed in the installation location Aa2 (the upper area in the business tower)) are rather high (0.5 or 0.6). Further, in the anomaly pattern corresponding to the device security levels, only the value of the anomaly score of the security level Zc (the forbidden area) is high (0.8). The determination unit 5 searches the storage unit 4 for similar anomaly patterns of the three types. As a situation of the group of office building facilities corresponding to the three types of anomaly patterns with the highest degrees of similarity, the determination unit 5 determines, for example, (1) the type of an abnormality that has occurred: a human intrusion into the forbidden area, (2) the location where the abnormality has occurred: Aa2 (the upper area in the business tower), and (3) the cause of the abnormality: an insider's perpetration (because of the low anomaly scores of Aa1 (the lower area of the business tower) adjacent to Aa2 (the upper area in the business tower) and of Aa (the entire business tower).

Figure 12:
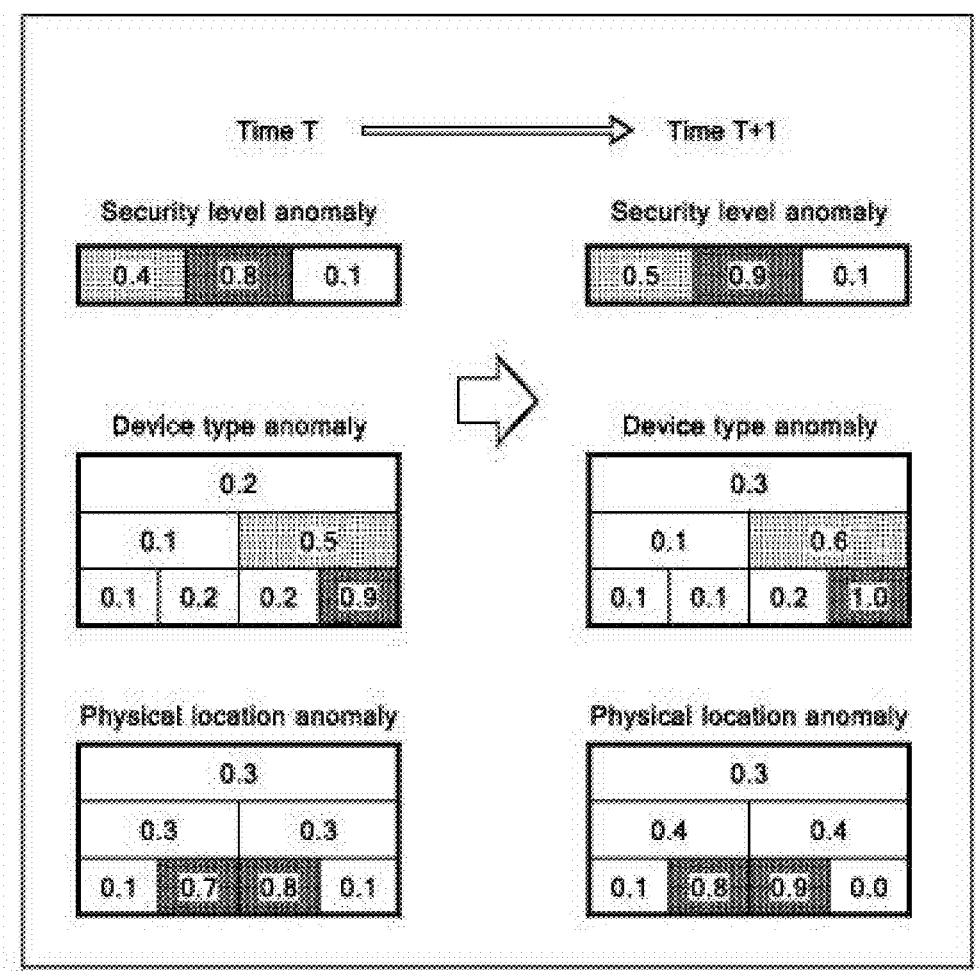
FIG. 12 is a diagram describing a case 2-2.

(Case 2-2) FIG. 12 shows changes over time in each of the three anomaly patterns corresponding to the device installation locations, device types, and device security levels of the group of office building facilities in a case 2-2. As shown, after a lapse of time from a time T to a time T+1, in the anomaly pattern corresponding to the device installation locations, the values of the anomaly scores of only two installation locations geographically apart from each other, Aa1 (the lower area of the business tower) and Ab2 (the upper area in the residence tower) are high (0.8 or 0.9). The values of the anomaly scores of the other installation locations, including the adjacent installation locations Aa2 (the upper area in the business tower) and Ab1 (the lower area of the residence tower), are not so high. In the anomaly pattern corresponding to the device types, the value of the anomaly score of only the temperature sensor Ya2 (version 5.0) (installed in Aa1 (the lower area in the business tower) and Ab2 (the upper area in the residence tower)) is high (1.0).

Further, in the anomaly pattern corresponding to the device security levels, the value of the anomaly score of the security level Zb (authorized personnel only) is high (0.9), and the value of the anomaly score of the security level Za (the public area) is also rather high (0.5). The security determination unit 5 searches the storage unit 4 for similar anomaly patterns of the three types. As a situation of the group of office building facilities corresponding to the three types of anomaly patterns with the highest degrees of similarity, the security determination unit 5 determines, for example, (1) the type of an abnormality that has occurred: a malfunction of a particular sensor, (2) the location where the abnormality has occurred: Aa1 (the lower area in the business tower) and Ab2 (the upper area in the residence tower) where Ya2 (version 5.0) is installed, and (3) the cause of the abnormality: a bug in Ya2 (version 5.0).

Figure 13:
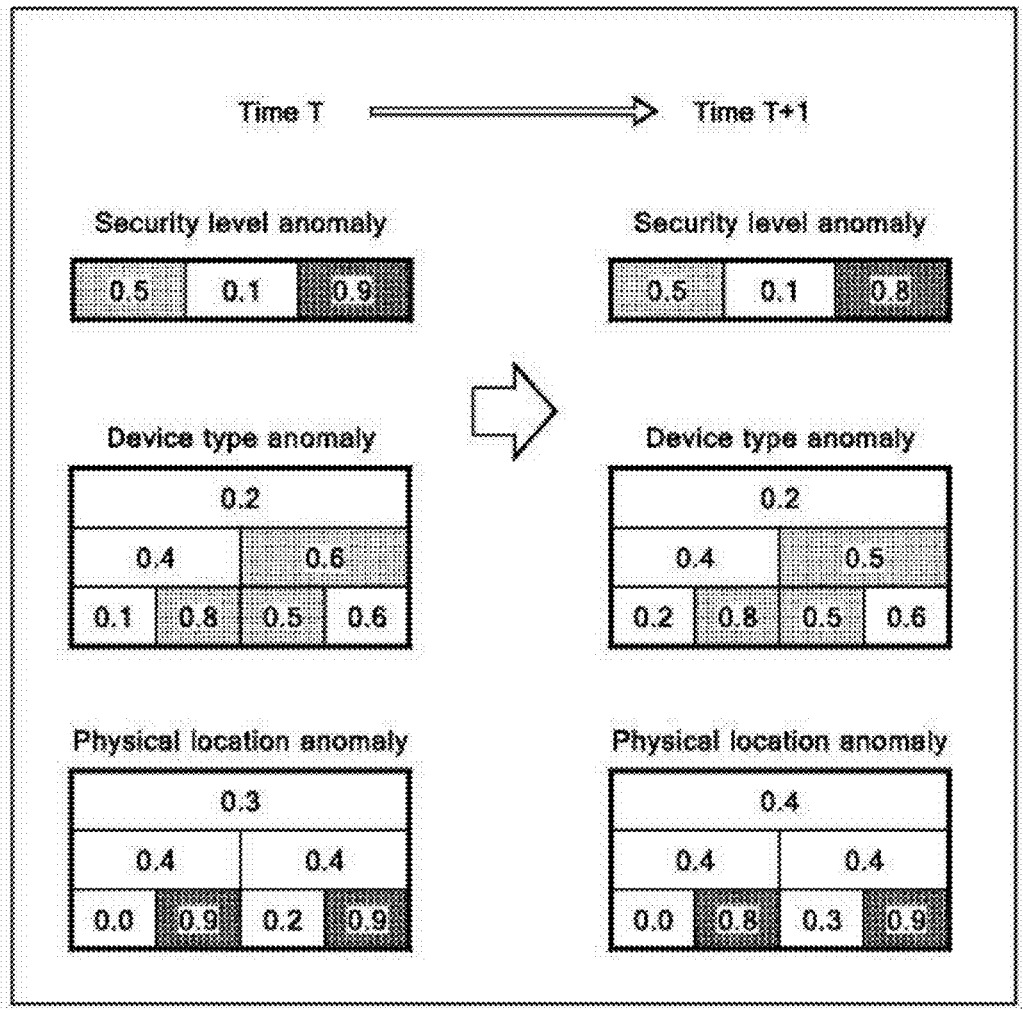
FIG. 13 is a diagram describing a case 2-3.

(Case 2-3) FIG. 13 shows changes over time in each of the three anomaly patterns corresponding to the device installation locations, device types, and device security levels of the group of office building facilities in a case 2-3. As shown, after a lapse of time from a time T to a time T+1, in the anomaly pattern corresponding to the device installation locations, the values of the anomaly scores of only two installation locations geographically apart from each other, Aa2 (the upper area in the business tower) and Ab2 (the upper area in the residence tower) are high (0.8 or 0.9). The values of the anomaly scores of the other installation locations, including the adjacent installation locations Aa1 (the lower area of the business tower) and Ab1 (the lower area of the residence tower), are not so high. In the anomaly pattern corresponding to the device types, the value of the anomaly score of the temperature sensor Yb2 (version 2.0) is high (1.0), and the anomaly scores corresponding to the temperature sensors manufactured by Y company are also rather high (0.5 or 0.6). Further, in the anomaly pattern corresponding to the device security levels, the value of the anomaly score of the security level Zc (the forbidden area) is high (0.8), and the value of the anomaly score of the security level Za (the public area) is also rather high (0.5). The security determination unit 5 searches the storage unit 4 for similar anomaly patterns of the three types. As a situation of the group of office building facilities corresponding to the three types of anomaly patterns with the highest degrees of similarity, the security determination unit 5 determines, for example, (1) the type of an abnormality that has occurred: incompatibility between sensors, (2) the location where the abnormality has occurred: Aa2 (the upper area in the business tower) and Ab2 (the upper area in the residence tower) where the version 2.0 manufactured by X company and the product manufactured by Y company are both installed, and (3) the cause of the abnormality: the occurrence of a failure due to the installation of both the version 2.0 manufactured by X company and the product manufactured by Y company.

The output unit 6 of the determination apparatus 1 displays to a user the anomaly patterns corresponding to the device installation locations, types, and security levels computed by the computation unit 3, and the situation of the group of office building facilities determined by the determination unit 5 (step S6 in FIG. 2).

Figure 14:
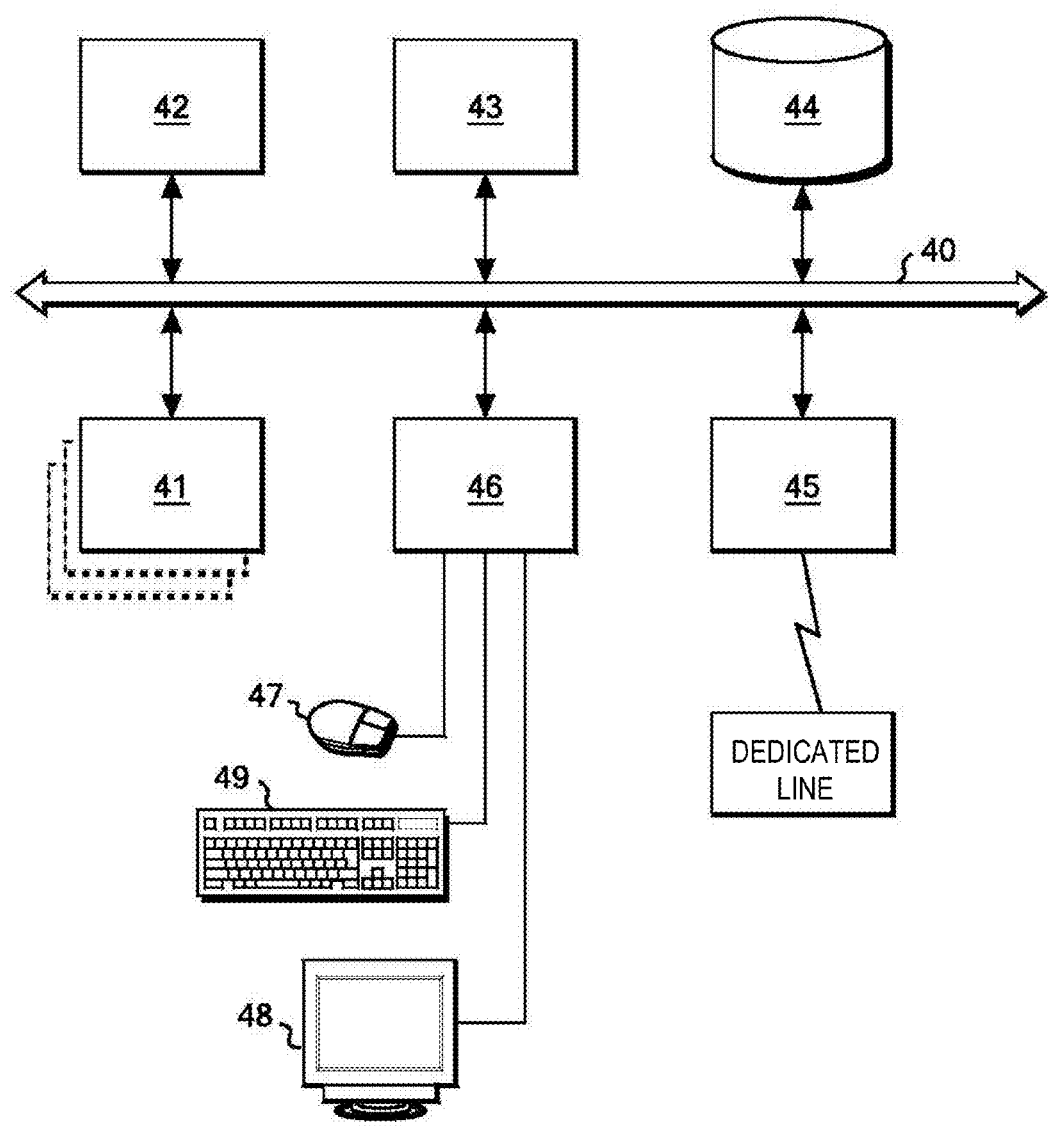
FIG. 14 is a hardware architecture of the determination apparatus 1.

A hardware architecture and a software architecture of the determination apparatus 1 according to the embodiments will be described. FIG. 14 is a block diagram showing a hardware architecture of the determination apparatus 1.

The hardware architecture of the determination apparatus 1 includes a (low-speed and high-speed) bus 40, and a CPU (Central Processing Unit) 41, a RAM (Random Access Memory: a storage device) 42, a ROM (Read Only Memory: a storage device) 43, an HDD (Hard Disk Drive: a storage device) 44, a communication interface 45, and an input/output interface 46, which are connected to the bus. The hardware architecture further includes devices such as a mouse (a pointing device) 47, a flat panel display (a display device) 48, and a keyboard 49, which are connected to the input/output interface 46. Although the determination apparatus 1 has been described as employing a general personal computer architecture, components such as the CPU 41 and the HDD 44 may be multiplexed for higher data processing capability and higher availability, for example. Besides a desktop personal computer, various types of computer systems may be employed, such as a laptop or tablet personal computer, a PDA (Personal Digital Assistant), and a smartphone.

The software architecture of the determination apparatus 1 includes an operating system (OS) that provides basic functions, application software that uses the functions of the OS, and driver software for the input/output devices. These pieces of software are loaded into the RAM 42 and executed by a component such as the CPU 41. Thus, the determination apparatus 1 generally functions as the input unit 2, the computation unit 3, the storage unit 4, the determination unit 5, and the output unit 6 shown in FIG. 1 to implement the operations shown in FIG. 2.

The invention claimed is:

1. A computer-implemented method comprising:
receiving, by a processor, measurement data from each of a plurality of measurement targets in a system comprising a plurality of industrial control systems;
computing, by the processor, a plurality of sets of anomaly values based on the measurement data and a computation algorithm according to a plurality of classifications corresponding to a plurality of properties of each measurement target;
computing, by the processor, an anomaly pattern using the plurality of sets of anomaly values computed based on the measurement data and the computation algorithm according to the plurality of classifications corresponding to the plurality of properties of each measurement target;
determining, by the processor, a situation of the system based on the anomaly pattern, wherein a determination of the situation of the system is made by comparing the anomaly pattern with previously stored anomaly; and
implementing a countermeasure action based at least in part on the situation of the system,
wherein the computation algorithm is selected from a plurality of computation algorithms based on a type of the measurement data.

2. The method according to claim 1, wherein at least one of the classifications is a hierarchical classification.

3. The method according to claim 1, wherein determining further comprises:
determining the situation of the system by comparing predetermined patterns of the sets of anomaly values corresponding to each situation of the system with the computed sets of anomaly values.

4. The method according to claim 1, wherein determining further comprises:
determining the situation of the system by comparing predetermined patterns of the sets of anomaly values corresponding to each situation of the system with simplified forms of the computed sets of anomaly values.

5. The method according to claim 1, wherein determining further comprises:

comparing predetermined patterns of the sets of anomaly values corresponding to each situation of the system with simplified forms of the computed sets of anomaly values and determining a situation corresponding to patterns with highest degrees of similarity as the situation of the system.

6. The method according to claim 1, wherein determining further comprises:
determining the situation of the system based on changes over time in the sets of anomaly values.

7. The method according to claim 1, wherein the plurality of properties is at least one of: a function, a network configuration, a type, or an installation location of each measurement target, a management organization of the installation location, or a security level of the installation location.

8. The method according to claim 1, wherein computing further comprises:
computing a first set of anomaly values based on the measurement data and the computation algorithm according to a first classification corresponding to a first property of each measurement target, and computing a second set of anomaly values based on the measurement data and the computation algorithm according to a second classification corresponding to a second property of each measurement target;
and wherein determining further comprises:
determining the situation of the system based on the first set of anomaly values, the second set of anomaly values, and a predetermined determination algorithm.

9. The method according to claim 8, wherein computing further comprises:
computing a set of network anomaly values based on the measurement data and the computation algorithm according to a network hierarchical structure corresponding to a network configuration of the measurement targets, and computing a set of location anomaly values based on the measurement data and the computation algorithm according to a location hierarchical structure corresponding to installation locations of the measurement targets;
and wherein determining further comprises:
determining the situation of the system based on the set of network anomaly values, the set of location anomaly values, and a predetermined determination algorithm.

10. The method according to claim 8, wherein computing further comprises:
computing a third set of anomaly values based on the measurement data and the computation algorithm according to a third classification corresponding to a third property of each measurement target;
and wherein determining further comprises:
determining the situation of the system based on the first set of anomaly values, the second set of anomaly values, the third set of anomaly values, and a predetermined determination algorithm.

11. The method according to claim 10, wherein computing further comprises:
computing a set of type anomaly values based on the measurement data the computation algorithm according to a hierarchical structure corresponding to types of the measurement targets, computing a set of location anomaly values based on the measurement data and the computation algorithm according to a hierarchical structure corresponding to installation locations of the measurement targets, and computing a set of security anomaly values based on the measurement data and the computation algorithm according to a structure corresponding to security levels of the installation locations of the measurement targets;
and wherein determining further comprises:
determining the situation of the system based on the set of type anomaly values, the set of location anomaly values, the set of security anomaly values, and a predetermined determination algorithm.

12. The method according to claim 1, further comprising:
displaying a determination result of the situation of the system to a user.

13. The method according to claim 1, further comprising:
displaying the sets of anomaly values and a determination result of the situation of the system to a user.

14. The method according to claim 1, wherein the plurality of industrial control systems each comprise different device types or are located in different geographic locations.

15. The method according to claim 1, wherein the type of the measurement data is one of numerical data and event data.

16. The method according to claim 15, wherein, when the type of the measurement data is numerical data, the plurality of computation algorithms is selected from the group consisting of a Hotelling's $T^2$ algorithm, a one-class support vector machine (SVM) algorithm, and a local outliner factor algorithm.

17. The method according to claim 15, wherein, when the type of the measurement data is event data, the plurality of computation algorithms is selected from the group consisting of an infrequent pattern mining algorithm, a Naive Bayes algorithm, and a hidden Markov algorithm.

18. A computer program product comprising a non-transitory storage medium readable by a processing circuit and storage instructions for execution by the processing circuit for performing a method comprising:
receiving measurement data from each of a plurality of measurement targets in a system comprising a plurality of industrial control systems;
computing a plurality of sets of anomaly values based on the measurement data and a computation algorithm according to a plurality of classifications corresponding to a plurality of properties of each measurement target;
computing an anomaly pattern using the plurality of sets of anomaly values computed based on the measurement data and the computation algorithm according to the plurality of classifications corresponding to the plurality of properties of each measurement target; and
determining a situation of the system based on the anomaly pattern, wherein a determination of the situation of the system is made by comparing the anomaly pattern with previously stored anomaly patterns; and
implementing a countermeasure action based at least in part on the situation of the system,
wherein the computation algorithm is selected from a plurality of computation algorithms based on a type of the measurement data.

19. A system, the system comprising:
a processor in communication with one or more types of memory, the processor configured to:
facilitate an input unit to receive measurement data from each of a plurality of measurement targets in the system comprising a plurality of industrial control systems;

facilitate a computation unit to
    compute a plurality of sets of anomaly values based on the measurement data and a computation algorithm according to a plurality of classifications corresponding to a plurality of properties of each measurement target;
    compute an anomaly pattern using the plurality of sets of anomaly values computed based on the measurement data and the computation algorithm according to the plurality of classifications corresponding to the plurality of properties of each measurement target;
    facilitate a determination unit to determine the situation of the system based on the anomaly pattern, wherein a determination of the situation of the system is made by comparing the anomaly pattern with previously stored anomaly patterns; and
    implement a countermeasure action based at least in part on the situation of the system,
    wherein the computation algorithm is selected from a plurality of computation algorithms based on a type of the measurement data.

20. The system of claim 19, wherein the processor is further configured to:
    facilitate a storage unit to store the computation algorithm and the determination algorithm.

21. The system of claim 20, wherein
the storage unit stores sets of anomaly values and situations of the system, each situation being associated with corresponding sets of anomaly values; and
the determination unit determines the situation of the system by comparing the computed sets of anomaly values with the stored sets of anomaly values.

22. The system of claim 20, wherein
the storage unit stores simplified patterns of sets of anomaly values and situations of the system, each situation being associated with corresponding simplified patterns; and
the determination unit determines the situation of the system by comparing the computed sets of anomaly values with the stored patterns.

23. The system of claim 19, wherein the processor is further configured to:
    facilitate an output unit to display a determination result of the situation of the system to a user.

* * * * *